Aug. 26, 1969 M. MORGAN 3,463,297
SKEW ASSEMBLY TABLE
Filed Sept. 21, 1967 6 Sheets-Sheet 1
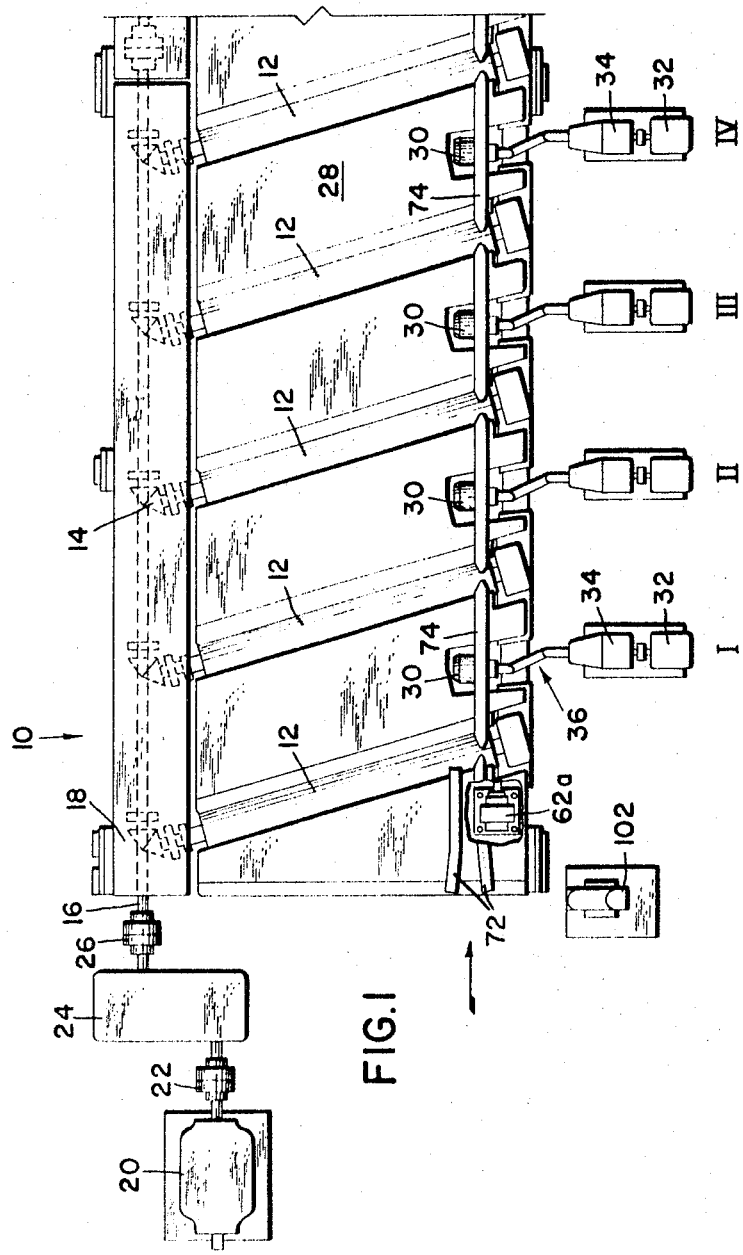
INVENTOR.
MYLES MORGAN
BY
Russell, Littick & Ofund
ATTORNEYS

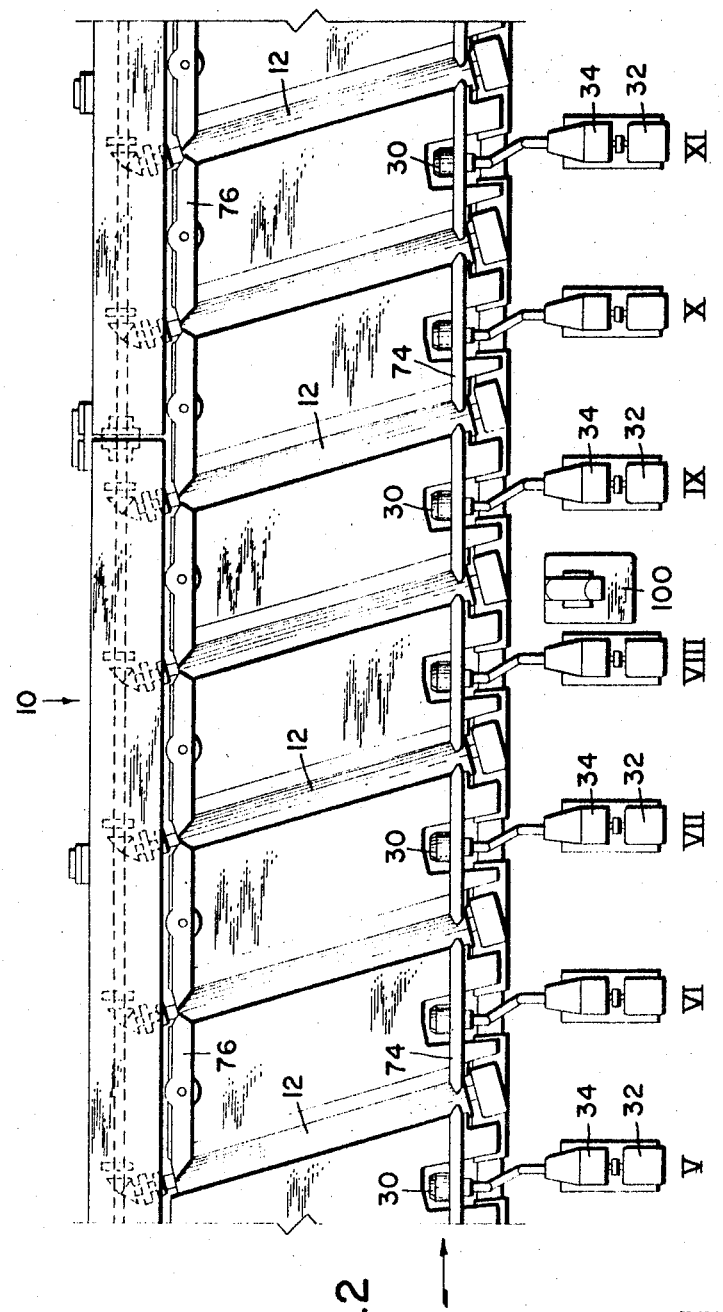

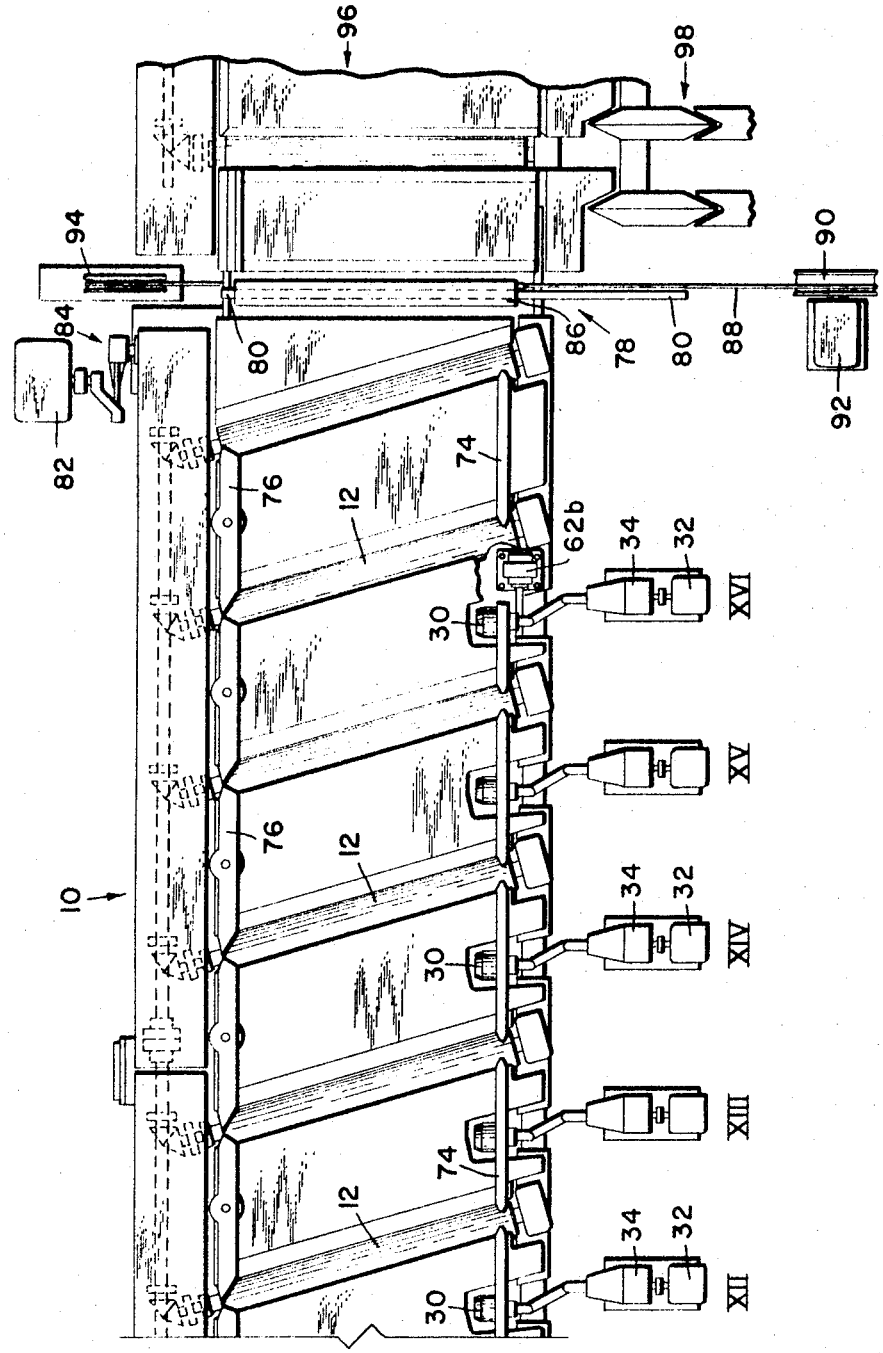

Aug. 26, 1969     M. MORGAN     3,463,297

SKEW ASSEMBLY TABLE

Filed Sept. 21, 1967     6 Sheets-Sheet 4

INVENTOR.
MYLES MORGAN
BY

ATTORNEYS

Aug. 26, 1969     M. MORGAN     3,463,297
SKEW ASSEMBLY TABLE
Filed Sept. 21, 1967     6 Sheets-Sheet 5
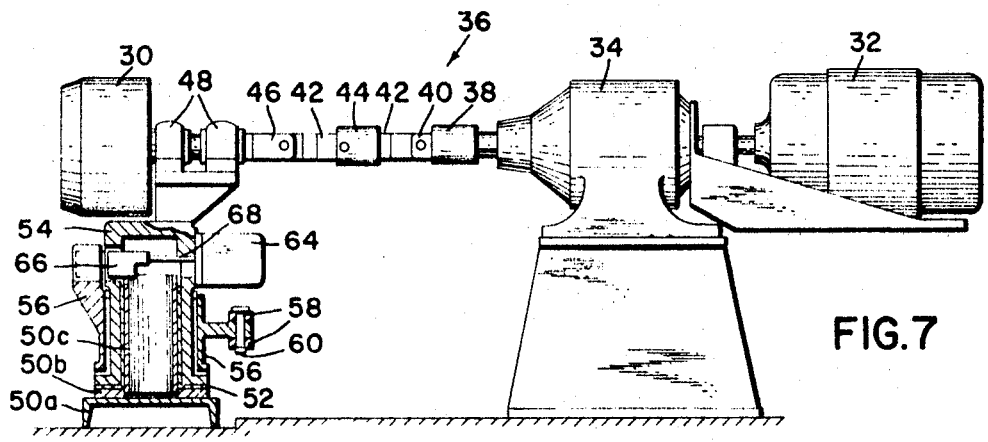
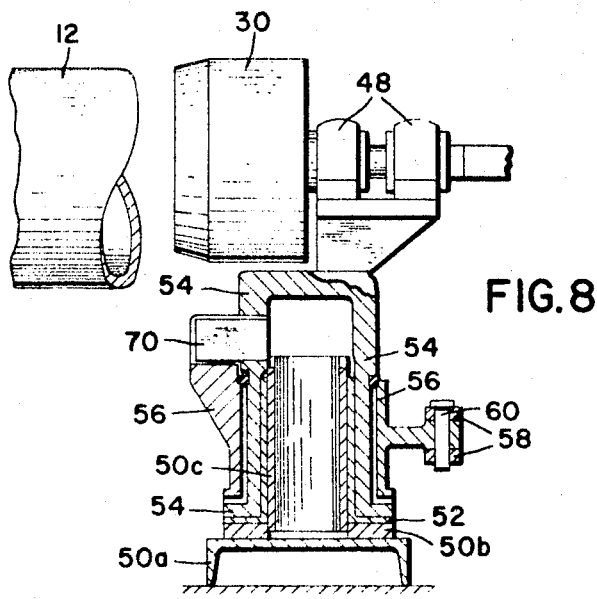
*INVENTOR.*
MYLES MORGAN
BY
ATTORNEYS

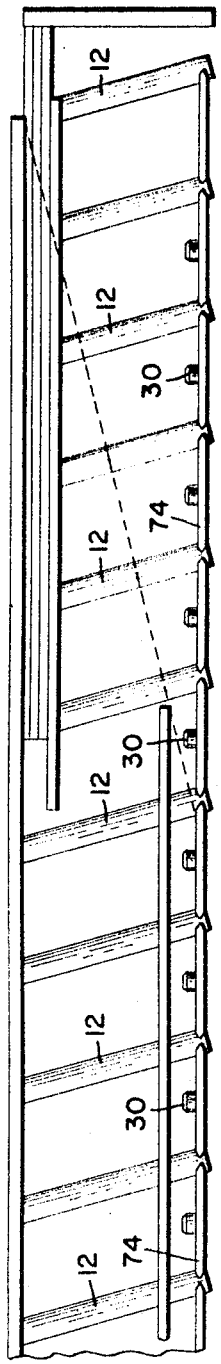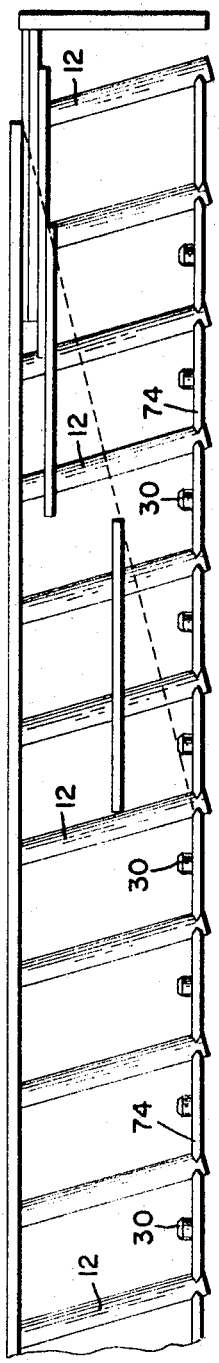

United States Patent Office 3,463,297
Patented Aug. 26, 1969

3,463,297
SKEW ASSEMBLY TABLE
Myles Morgan, Worcester, Mass., assignor to Morgan Construction Company, Worcester, Mass., a corporation of Massachusetts
Filed Sept. 21, 1967, Ser. No. 669,647
Int. Cl. B65g 13/02
U.S. Cl. 198—127
6 Claims

ABSTRACT OF THE DISCLOSURE

A skew assembly table for assembling sequentially moving billets into packs of parallel billets having aligned leading ends. The assembly table has a plurality of parallel, horizontally spaced, driven rollers that are skewed with reference to the longitudinal table axis. The skewed table rollers force the billet to move both transversely and longitudinally along the table until the billet strikes the table side guides whereupon it moves longitudinally downstream to a combination sliding, disappearing stop. Succeeding billets are assembled against the stop to form a pack of parallel billets having a common leading edge. A plurality of selectively operable kickoff rollers are employed to discharge the billets onto the table rollers at a predetermined location downstream from the entry end of the assembly table.

BACKGROUND OF THE INVENTION

This invention relates to product handling equipment in general, and more particularly, to an apparatus for assembling serially moving, incremental, longitudinal product into one or more groups each containing a plurality of the incremental, longitudinal product arranged in parallel, side-by-side relation with the leading ends thereof in alignment. The skew assembly table of the present invention has particular application in the steel industry for assembling separated, sequentially moving billets into packs of parallel billets for transfer to a subsequent processing station such as, for example, a cooling bed.

BRIEF SUMMARY OF THE INVENTION

The skew assembly table provides a means for converting the physical flow pattern of an incremental, longitudinal product from a serial pattern to a parallel or parallel-series pattern. Provision is made in the present invention for handling different lengths of product and for assembling the longitudinal product into a predetermined number of packs of parallel product for subsequent serial processing of each pack. Each pack is automatically assembled with the leading ends of the longitudinal product in alignment before the pack is released from the skew assembly table for further processing.

The particular features and advantages of the present invention will best be understood and appreciated from a detailed description of a preferred embodiment of the invention, selected for purposes of illustration and shown in the accompanying drawings.

BRIEF DESCRIPTION OF THE SEVERAL VIEWS OF THE DRAWINGS

FIGURES 1, 2 and 3, when assembled as shown in FIGURE 4, depict in plan view a skew assembly table constructed in accordance with the present invention;

FIGURE 7 is a view in side elevation of the kickoff roller and drive mechanism showing a selectively operable latching mechanism for latching the roller to an oscillating drawbar;

FIGURE 8 is a view in side elevation of the kickoff roller and drive mechanism showing the roller permanently latched to the oscillating drawbar;

FIGURE 9 is a simplified diagrammatic plan view of the skew assembly illustrating the assembly of relatively long lengths of product; and, FIGURE 10 is another simplified diagrammatic plan view of the assembly table illustrating the assembly of relatively short lengths of product.

DESCRIPTION OF THE PREFERRED EMBODIMENT

Figure 5:
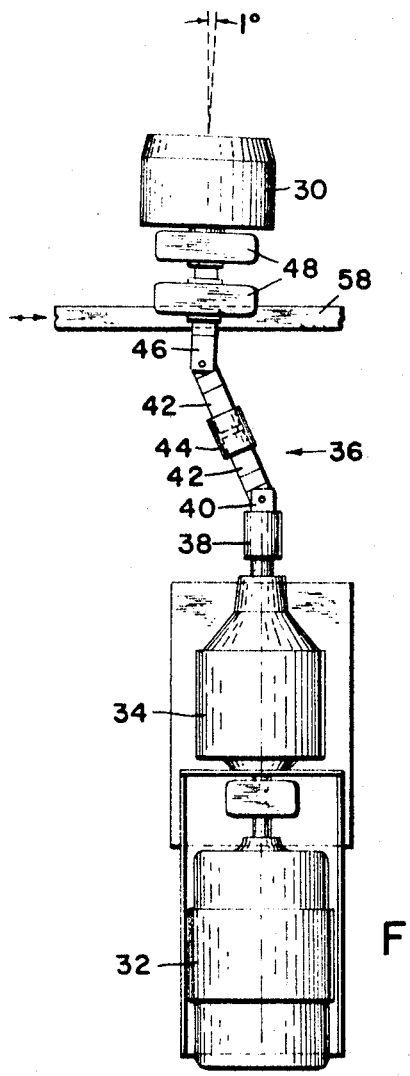
FIGURE 5 is an enlarged plan view of a kickoff roller and the associated drive mechanism showing the roller in the "normal" or product forwarding position.

Turning now to the drawings, and particularly to FIGURES 1, 2 and 3 thereof, there is shown in plan view a skew assembly table constructed in accordance with the present invention and indicated generally by the reference numeral 10. For purposes of illustration, the following description of the assembly table will be related to the previously mentioned application in the steel industry wherein the table is employed to assemble sequentially moving billets into packs of aligned, parallel billets. However, it should be understood that the invention is not limited to this particular application, but instead, encompasses the broader concept of assembling incremental, longitudinal product.

The skew assembly table 10 has a plurality of parallel, horizontally spaced table rollers 12 which are driven through bevel gears 14 by a common driveshaft 16 rotatably mounted within a protective housing 18. Motive power for the driveshaft is obtained from an electric motor 20 through coupling 22, gear reduction unit 24 and coupling 26.

The area between each of the skew assembly table rollers is occupied by a beveled, horizontal table plate 28. The plates 28 are mounted in a horizontal plane that is located above the plane containing the table roller axes and slightly below the plane which is tangent to the uppermost surfaces of the table rollers 12. Given this structural relationship, it can be seen that the billets will ride on and be driven by the rotating uppermost surface of each table roller. Since the table rollers 12 are angled or "skewed" with respect to the longitudinal table axis, the rotating rollers will impart both a transverse and a longitudinal motion to the product (not shown) which is discharged onto the table rollers as will be hereinafter explained.

The horizontal plates 28 are each notched at one end, as shown in FIGURES 1 through 3, to provide space for an interdigited, pivotally mounted billeted kickoff roller 30. The kickoff rollers are individually driven by a stationary electric motor 32 through a stationary gear reduction unit 34 and a flexible power transmitting assembly, indicated generally by the reference numeral 36 in FIGURES 1 through 3 and shown in greater detail in FIGURES 5, 6 and 7. Referring to the later figures, the output shaft of the gear reduction unit is connected, by coupling 38 to a universal joint 40 which in turn is connected, by means of adapters 42 and coupling 44, to a second universal joint 46 which drives the kickoff roller 30.

In addition to rotating about a horizontal axis, each kickoff roller is also capable of pivoting about a vertical axis. Looking at FIGURES 7 and 8, the mounting system for the kickoff roller 30 and its associated bearings 48 comprises a stationary base member 50a, 50b and 50c, bushing 52 and a base pivot 54 which can be rotated about the vertical axis of the stationary, cylindrical base member 50c. Coaxially mounted with respect to both the stationary base member 50c and base pivot 54, is a support pivot 56 which is secured to a reciprocatory drawbar 58 by means of fastener 60.

The drawbar 58 is powered by two selectively operable air cylinders 62a and 62b with one cylinder positioned on each end of the drawbar as shown in FIGURES 1 and 3. A timed sequential actuation of the air cylinders 62a and 62b will cause the drawbar to move in a reciprocatory pattern thereby imparting an oscillatory rotary motion to each one of the support pivots 56.

Figure 6:
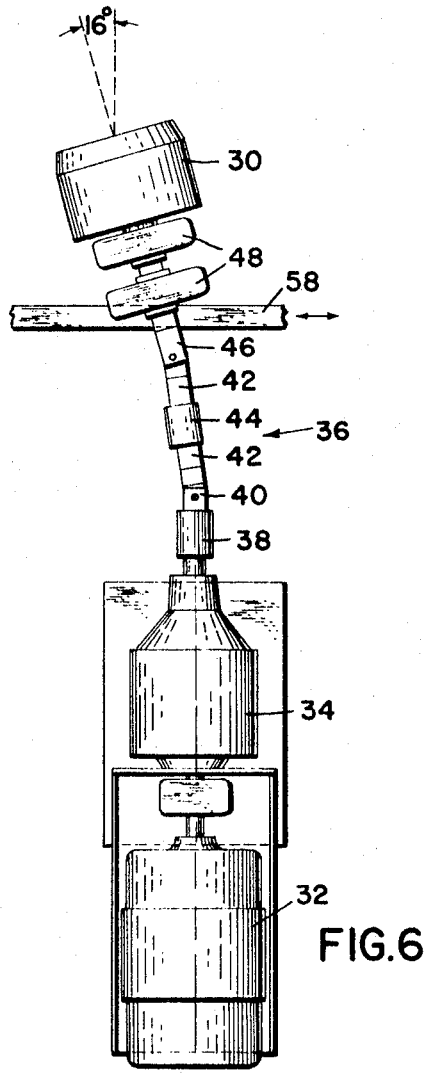
FIGURE 6 is an enlarged plan view of the kickoff roller and drive mechanism illustrated in FIGURE 5 showing the kickoff roller in the "skewed" or product discharging position.

For purposes which will be explained hereinafter, selected kickoff rollers 30 are latched to their support pivots 56 so that the rollers will oscillate in unison between the "normal" and "skewed" positions as shown in FIGURES 5 and 6, respectively. Two latching arrangements are utilized in the preferred embodiment of the present invention to tie the kickoff rollers and base pivots to their corresponding oscillatory support pivots. Referring to FIGURE 7, the first arrangement is employed to latch selected kickoff rollers to the reciprocating drawbar. Selective latching is obtained by means of a double acting air cylinder 64 driving a movable drawbar latch 66 through connecting shaft 68. By appropriate solenoid actuated valving (not shown), the air cylinder 64 can be actuated to move the drawbar latch 66 from an unlatched position to a latched position and vice versa. In FIGURE 7 the movable drawbar latch 66 is shown by solid lines in the unlatched position and by dotted lines in the latched position. With the drawbar latch in the latched position, the kickoff roller 30 is latched to the support pivot which in turn is tied to the drawbar by fastener 60. In this way the straight line reciprocatory motion of the drawbar is converted to a rotary oscillatory motion which in turn is imparted to the kickoff roller base pivot 54 whereby causing the kickoff roller to swing back and forth between the "normal" and "skewed" positions as shown in FIGURES 5 and 6, respectively.

The first or selectively operable latching arrangement is used with each of the kickoff rollers 30 identified in FIGURES 1 and 2 by the Roman numerals I through XI. The second or fixed latching arrangement is used with the kickoff rollers identified by Roman numerals XII through XVI in FIGURE 3. The fixed latching arrangement is shown in detail in FIGURE 8 wherein it can be seen that a fixed drawbar latch 70 permanently ties the kickoff roller base pivot 54 to the oscillating support pivot 56 so that kickoff rollers XII through XVI will oscillate in unison as the drawbar moves back and forth.

Having described in detail a major portion of the skew assembly table structure, it will now be helpful to relate the invention to the product flow path before describing the remaining table structure and the operation of the invention. It has already been mentioned that, as an illustrative example, the present invention will be discussed in terms of assembling separated, sequentially moving billets into packs of aligned, parallel billets. Upstream from the skew assembly table 10 and not shown in the drawings, are the billet shear and shear runout table. After being cut at the billet shear, the billets are accelerated by the shear runout table to obtain separation between lengths. From the runout table the billets are fed through an input stock or product guide 72 located at the entry end of the skew assembly table along the mill center line. Referring to FIGURES 1 through 3, it can be seen that the kickoff rollers 30 are spaced along the downstream extension of the stock guide longitudinal axis so that the billets, as they exit from the stock guide 72, will ride on and be moved by the rotating uppermost surfaces of the kickoff rollers which are located slightly above the corresponding rotating surfaces of the table rollers as illustrated in FIGURE 8.

Assuming that kickoff rollers numbered I through X in FIGURES 1 and 2 are not latched to the reciprocating drawbar, the rollers will remain in their "normal" or product forwarding position, as shown in FIGURE 5, with the axes of the kickoff rollers disposed slightly ahead i.e. downstream of the transverse axes of the assembly table rollers and the moving product. This slightly positive skewing of the kickoff roller axes forces the moving billet against side guards 74 and keeps the billet away from the shouldered portion of the kickoff roller. In practice, it has been found that a one degree positive skewing of the kickoff rollers is sufficient to keep the moving billet on the kickoff rollers until the billet reaches the predetermined discharge point measured along the longitudinal axis of the assembly table.

The billet discharge point is determined by the location of the first kickoff roller that is latched to the drawbar, in this case, kickoff roller number XI shown in FIGURE 2. Movement of the drawbar 58 causes kickoff roller number XI to pivot from the "normal" or product forwarding position to the "skewed" or product discharging position shown in FIGURES 5 and 6, respectively. Looking at these figures, it can be seen that the axis of the kickoff roller has been rotated through an angle of seventeen degrees between the "normal" and "skewed" kickoff roller positions. Since the table roller axes are skewed negatively by sixteen degrees with respect to the transverse table axis, rotation of the kickoff roller axis from a one degree positive skewed position through seventeen degrees of arc in the upstream direction will place the kickoff roller axis parallel to the table roller axes in the "skewed" or product discharging position.

The last five kickoff rollers in the downstream direction i.e., rollers numbered XII through XVI in FIGURE 3 are permanently latched to the drawbar by means of the latching arrangement shown in FIGURE 8. Thus, when the drawbar is moved by the double-acting air cylinder, kickoff rollers numbered XI through XVI will pivot in unison to the "skewed" or product discharging position.

In the preferred embodiment described herein and illustrated in the drawings, the first eleven kickoff rollers, counting from the entry end of the assembly table, are selectively operable by actuation of the appropriate air cylinders 64. Each of these kickoff rollers has the selective latching arrangement depicted in FIGURE 7 to permit latching from none to all eleven of the kickoff rollers to the drawbar. It will be appreciated that the particular number of kickoff rollers attached to the drawbar can be changed by the operator to accommodate various lengths of product. Furthermore, it should be understood that the particular number of selectively operable and permanently latched kickoff rollers described herein is merely illustrative and should not be considered as limiting the scope of the present invention.

Once the billet has been transferred laterally from the kickoff rollers onto the skew assembly table rollers, the rotation of the table roller will cause the lateral motion of the billet to continue at the speed of the table rollers 12. The path traveled by the front end of the billet or any point on the billet will be perpendicular to the axes of the table rollers, as illustrated in the diagrammatic views of FIGURES 9 and 10. The transverse motion of the billet across the skew assembly table continues until the billet strikes the table sideguards 76. Further motion of the billet is confined by the sideguards to the forward direction and the billet progresses downstream along the assembly table until it encounters a combination sliding, disappearing stop, indicated generally by the reference numeral 78. The combination stop 78 includes a stop plate 80 capable of being indexed in a vertical direction between an upper product stopping position and a lower product passing position by means of motor-reduction unit 82 and its associated connecting linkage indicated generally by the reference numeral 84.

Positioned on top of the stop plate 80 is a slide plate 86 having a generally inverted U-shaped vertical cross-sectional configuration. The slide plate 86, which moves along the upper surface of the stop plate 80 in a transverse direction across the skew assembly table, is pulled in one direction by a wire rope 88 that is wound around take-up reel 90 whenever reversing motor-reduction unit 92 is energized for rotation in one direction. The wire rope 88 is also attached to the other end of slide plate 86 through a take-up idler sheave 94 so that when the motor-reduction unit 92 is reversed, the slide plate will be pulled in the opposite direction.

The operation of the combination disappearing, sliding stop can best be understood by referring to the plan view of the stop shown in FIGURE 3 and the diagrammatic view of the skew assembly table illustrated in FIGURE 9. At the beginning of a billet assembly cycle, the stop plate 80 is indexed to the full up position and the slide plate 86 is retracted by a predetermined amount to provide sufficient width to collect the desired number of billets against the stop plate. As the desired number of billets are stopped against the stop plate, additional billets will begin to accumulate against the slide plate. At this point, the stop plate is dropped until its top is slightly below the top of the table rollers 12. This will permit the accumulated pack of billets to pass on down onto runon table 96 for subsequent transfer to cooling bed 98.

With the stop plate in this position, the slide plate is still above the table rollers to stop oncoming billets. As the previously assembled pack passes down the table, the upstream ends of the oncoming billets, as they accumulate against the slide plate, will "walk" over to the sideguards 76 due to the force of the rotating skew assembly table rollers 12. Once the pack of billets has passed completely over and beyond the stop and slide plates, the slide plate 86 is indexed over to the full width of the stop plate by the operation of motor-reduction unit 92. Thereafter, the slide plate functions as the stopping surface for the balance of the billets. In this position of the slide plate, the combination stop 78 operates simply as a disappearing stop.

When the balance of the billets has been assembled against the slide plate, the entire unit i.e. both the stop and slide plates, is indexed to full down. In this position, the two plates are below the top of the table rollers thereby permitting the second pack of billets to pass onto the runon table 96. With the stop 78 in the full down position, the slide plate 86 is retracted by motor-reduction unit 92 to its previous position. Then, upon passage of the entire second pack across the stop, the stop plate 80 is indexed to the full up position and the billet assembly cycle is ready to begin again.

The preceding description of the operational sequence of the combination disappearing, sliding stop 78 is applicable whenever the number of billets produced from a bloom exceeds the effective width of the assembly table. In this situation, the billets must be assembled into a plurality of packs as described above. However, if the number of billets produced from the bloom does not exceed the effective width of the table, then only one pack assembly is required and the combination stop 78 can be operated simply as a disappearing stop with the slide plate 86 extended across the entire width of the stop plate 80.

At this time, it will be helpful to briefly review the major components of the present invention before discussing the manual and automatic modes of operation and, in particular the compensatory adjustments which must be made for varying lengths of product, number of billets produced per bloom and other production variables. The show assembly table of the present invention provides a means for assembling serially moving billets into packs of parallel, aligned billets. The billets enter the assembly table through a stock guide which feeds the moving billets onto selectively operable kickoff rollers. The kickoff rollers can be pivoted from a "normal" or billet forwardly position to a skewed billet discharging position by latching the rollers to a reciprocatory drawbar powered by a double-acting air cylinder. The billets are discharged from the selectively skewed kickoff rollers onto rotating table rollers that are disposed at an angle to the longitudinal axis of the table. The angled or skewed table rollers cause the billet to travel forwardly and across the table until the billet strikes the table sideguards. Thereafter, the billet moves only in a forward direction down the table until it strikes the combination stop. Succeeding billets are assembled at the stop into a pack of parallel, aligned billets which then pass on down to the cooling bed runon table.

The skew assembly table can be operated in either a manual or automatic mode. In the manual mode, the operator selects the desired billet discharge point and then latches the appropriate kickoff rollers to the drawbar by actuating the corresponding air cylinders 64. Actuation of the drawbar air cylinder by the operator causes the drawbar to move in one direction thereby pivoting all of the latched kickoff rollers to the skewed product discharging position. It will be appreciated that the operator can change the billet discharge point to accommodate different lengths of product merely by latching or unlatching the necessary kickoff rollers after returning all of the selectively operable kickoff rollers to their normal position by moving the drawbar in the opposition direction.

In the automatic mode, the drawabar is cycled back and forth in response to signals from a kickoff hot metal detector (HMD) 100 located downstream from the entry end of the table as shown in FIGURE 2. Upon a signal from HMD 100, the drawbar moves in one direction causing the latched kickoff rollers to pivot to the skewed product discharging position. Actuation of a skewed position limit switch (not shown), after a set time delay, causes the drawbar to move in the opposite direction thereby returning the latched kickoff rollers to their "normal" billet forwarding position. Automatic operation of the kickoff roller drawbar is initiated after an adjustable time delay following the detection of the front end of a billet by the kickoff HMD 100. The time delay following detection of the bar at HMD 100 is composed of two parts; a preset adjustable time delay and an incremental, accumulative time delay that is a function of the number of lengths which have passed HMD 104 in a given billet assembly cycle.

When the product from a bloom is cut into short lengths, the width of a single pack generally exceeds the effective width of the skew assembly table. In such circumstances it is necessary to divide the billets into two packs and allow the first pack to pass on to the cooling bed while the second pack is being assembled against the stop. The operation of the combination disappearing, sliding stop 78 in these circumstances has already been described and it will be remembered that the second pack is assembled against the slide plate 86 after the plate has been drawn by motor-reduction unit 92 to the full in position on top of stop plate 80. The operation of slide plate 86, whether by hand control or by automatic control, is used to generate a signal for interrupting the timing or counting sequence previously described. Upon the signal for the slide to move, the time increment portion of the time delay is reduced to zero and an additional preset time delay is added to the previously mentioned preset adjustable delay for the first length following motion of the slide. Thereafter, the total delay is incrementally increased in accordance with the number of second pack billets that pass HMD 100.

When the last length from a bloom is transferred to the skew assembly table rollers from the kickoff rollers, the automatic controls must be reset to the first-billet-from-a-bloom condition. A system reset signal is provided by a speed compensated timer or integrator (not shown) which is actuated by a signal from a last billet hot metal detector 102 located at the entry end of the table as shown in FIGURE 1.

From the foregoing functional description of the automatic mode of operation of the skew assembly table, it will be obvious to those skilled in the art that the control functions described herein can be implemented by well-known circuitry utilizing readily available components. For this reason, it has not been deemed necessary to set forth the actual circuitry in the present application in order to provide a full and complete description of the invention for those skilled in the art to which it pertains.

Having described in detail a preferred embodiment of the present invention, it will now be apparent to those skilled in the art that numerous modifications can be made without departing from the scope of the invention. For example, although specific angles have been set forth for the skew assembly table rollers and the kickoff rollers, both in the "normal" and "skewed" positions, these angles should not be construed as limiting the invention, but instead, should be considered as an illustration of the basic concept of the skew assembly table.

What I claim is:

1. A skew assembly table for assembling serially moving, incremental, longitudinal product into at least one pack of parallel product having aligned leading ends, said assembly table comprising: an input product guide; a plurality of horizontally spaced, rotatable table rollers having the axes thereof skewed with respect to the longitudinal axis of said product guide; a plurality of horizontally spaced, rotatable kickoff rollers positioned along the downstream extension of the longitudinal axis of the product guide, said kickoff rollers being pivotally mounted about a vertical axis for rotation between a product forwarding position and a product discharging position; means for pivoting selected kickoff rollers between said positions; and, means for aligning the leading ends of said discharged product.

2. The apparatus of claim 1 wherein said pivoting means comprises: a drawbar; means for imparting reciprocatory motion to said drawbar; and, means for latching selected kickoff rollers to said drawbar.

3. The apparatus of claim 1 further characterized by the axes of said kickoff rollers being skewed positively with respect to the transverse table axis when the rollers are in the product forwarding position and negatively with respect to the same axis when in the product discharging position.

4. The apparatus of claim 3 further characterized by the axes of said kickoff rollers being parallel to the axes of said table rollers when said kickoff rollers are in the product discharging position.

5. The apparatus of claim 1 further characterized by said product aligning means being operable to align a predetermined number of said discharged product before passing on said product.

6. The apparatus of claim 5 wherein said aligning means comprises: a combination disappearing, sliding stop having a stop plate and a slide plate; and, means for moving each of said plates from a product aligning position to a product passing position.

References Cited
UNITED STATES PATENTS

| | | | |
|---|---|---|---|
| 1,228,543 | 6/1917 | Edwards | 198—127 |
| 2,868,348 | 1/1959 | Thurman | 198—127 |

RICHARD E. AEGERTER, Primary Examiner